UNITED STATES PATENT OFFICE.

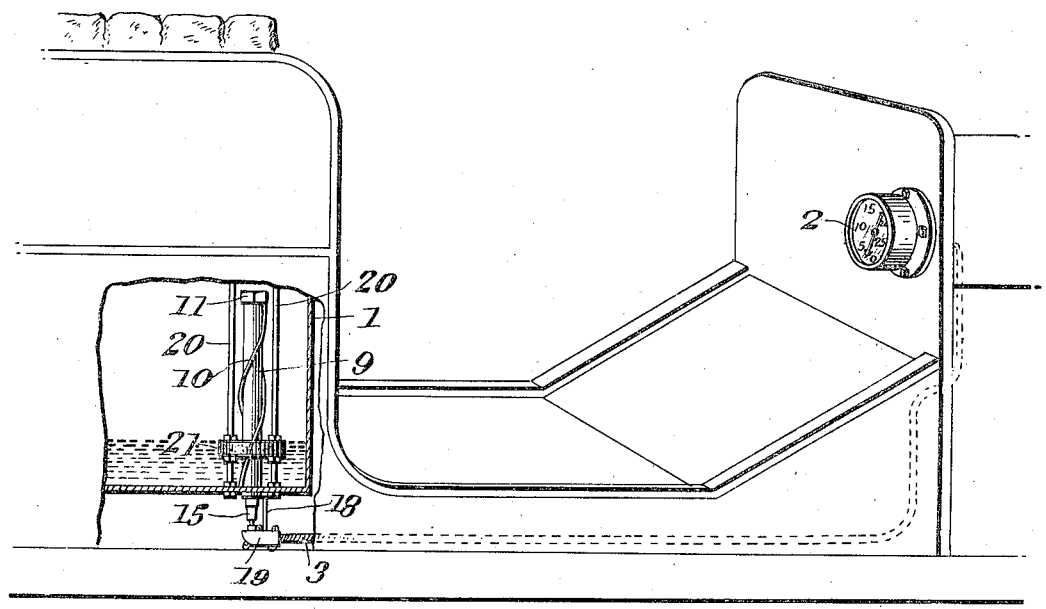
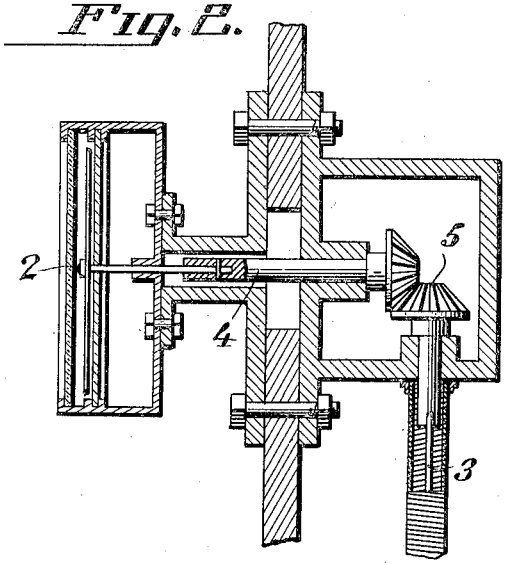

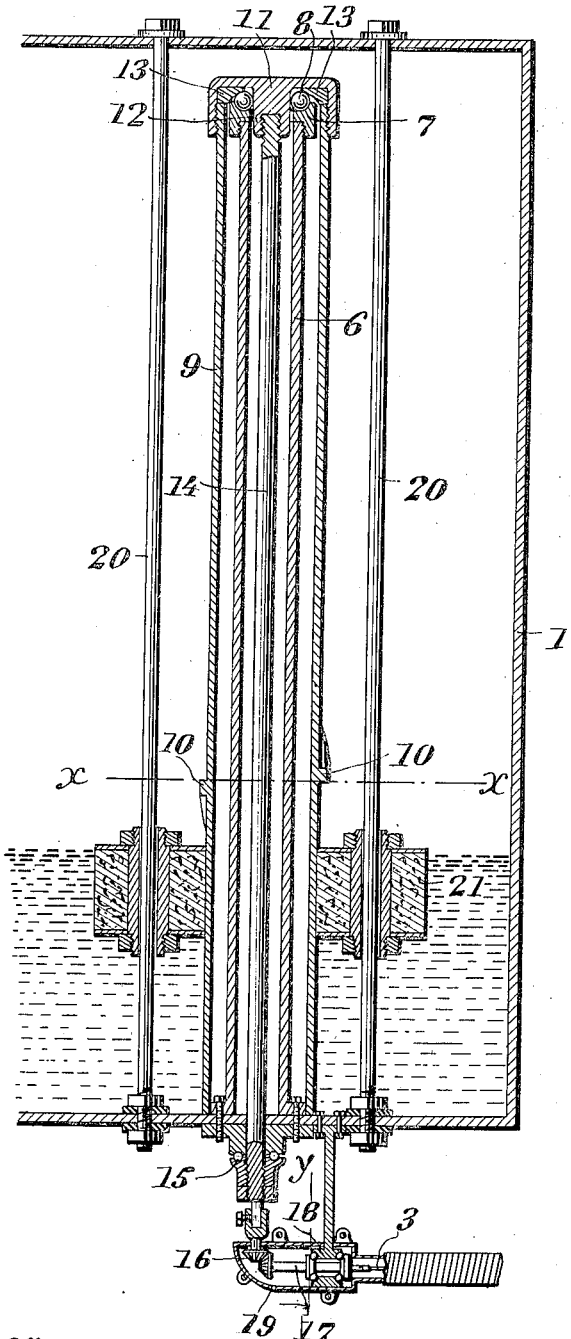

LELAND A. FRAME, OF COALINGA, CALIFORNIA.

FLUID-GAGE.

1,103,750.

Specification of Letters Patent.

Patented July 14, 1914.

Application filed September 24, 1913. Serial No. 791,628.

*To all whom it may concern:*

Be it known that I, LELAND A. FRAME, a citizen of the United States, residing at Coalinga, in the county of Fresno and State of California, have invented new and useful Improvements in Fluid-Gages, of which the following is a specification.

The invention provides means for automatically indicating the depth or amount of fluid contained in a tank or like receptacle, being designed chiefly for use in connection with tanks for holding fuel for motor vehicles and boats so that the operator may be advised at all times as to the exact depth or quantity of fuel contained in the tank without requiring inspection of such tank which is not always convenient and for that reason is frequently overlooked.

In accordance with this invention an indicator is located in convenient position to be practically under observation at all times and the movable part of such indicator is connected preferably by means of a flexible shaft with a fluid operated device arranged within the tank and actuated by the change of level of the fluid therein, whereby the indicator at all times shows the exact level or amount of fluid contained in the tank or like receptacle.

The invention consists of the novel features, details of construction and combination of parts, which hereinafter will be more particularly set forth, illustrated in the accompanying drawings, and subsequently claimed.

Referring to the drawings, forming a part of the specification, Figure 1 is a detail view, showing the application of the invention. Fig. 2 is a detail view partly in section, showing more clearly the means whereby the indicator is operated. Fig. 3 is a sectional view of the means arranged in the tank or other receptacle or container to be operated by the change of level of the fluid therein and connected with the indicator for actuating the same. Fig. 4 is a horizontal section on the line $x$—$x$ of Fig. 3. Fig. 5 is a detail section on the line $y$—$y$ of Fig. 3, looking to the right, as indicated by the arrow, showing the parts on a larger scale.

Corresponding and like parts are referred to in the following description, and indicated in all the views of the drawings, by the same reference characters.

The numeral 1 designates a tank, receptacle or container for holding the fluid whose depth or quantity is to be automatically indicated at all times. The tank 1 or like part may be conveniently located and is adapted to receive the operating means whereby the indicator is actuated, said operating means being controlled by the change of level of the fluid contained in the tank 1. An indicator 2 of any make or variety is arranged in convenient position to be at all times under observation so that the readings may be readily ascertained. In the case of motor driven vehicles the indicator is preferably located upon the dash and is connected with the fluid operated means of the tank or container 1 by means of a Borden wire 3 or like flexible shaft or connection. The indicator 2 is of the type embodying a dial and a movable hand, the latter being secured to a shaft 4, which in turn is connected by means of bevel gearing 5 with the flexible connection or shaft 3. When the tank or container 1 is empty the indicator 2 points to zero, thereby designating that such tank is empty. When the tank is full the indicator registers the predetermined amount. As the tank becomes empty the indicator registers the level of the fluid, thereby enabling the operator to determine the level or amount of fluid contained in the tank at any time.

A tube 6 is located within the tank 1 and is preferably bolted or otherwise secured to the bottom thereof. A cup 7 is threaded to the upper end of the tube 6 and receives balls 8. A second tube 9 is slipped upon the tube 6 and is free to turn, being provided with spiral flanges 10 which preferably make one turn about such tube. A cap 11 is threaded on the upper end of the tube 9 and is formed upon its inner side with a boss 12 which constitutes the cone of a ball bearing. A ring 13 is grooved upon its lower side and receives the balls 8, said ring being supported upon the upper end of the tube 6. A rod 14 is secured to the cap 11 so as to turn with the tube 9. The rod 14 is threaded at its upper end to the boss 12 of the cap 11 and passes through the tube 6 and bottom of the tank or part 1. A ball bearing 15 is located near the lower end of the rod 14 so as to reduce the friction to the smallest amount possible, thereby enabling the tube 9 and rod 14 to turn freely. Bevel gearing 16 connects the lower end of the rod 14 with a shaft 17 which is journaled in a bracket 18 secured to the lower part of the tank 1. A housing 19 incloses the gearing 16 and shaft 17. The Borden wire or flexible shaft 3 is connected in any manner to the shaft 17 so as to rotate therewith.

Guide rods 20 are secured to the top and bottom of the tank or part 1 and receive a float 21, which is mounted upon the tube 9 to move freely thereon in a vertical direction. The float 21 is notched to receive the spiral ribs 10 so that vertical movement of the float causes the tube 9 and rod 14 to turn. The spiral connection between the float and tube 9 is such that one complete movement of the float in either direction causes the tube 9 to make one revolution which is transmitted to the shaft carrying the hand of the indicator, thereby causing such hand to make one revolution over the dial. When the float 21 is at the bottom of the tank the hand of the indicator points to zero on the dial and when the float is at the top of the tank the hand of the indicator points to the scale indication to designate that the tank is full. As the fluid is drawn from the tank and the level lowers the float descends, thereby turning the tube 9 and the hand of the indicator so as to show the exact level or amount of fluid remaining. The construction is such as to admit of the indicator being located in any convenient position so that the level or quantity of fluid contained in the tank may be ascertained at any time without requiring inspection of the tank or the introduction therein of a gage or other article to determine the level of the fluid. It is also noted that the indicator may be used as means to determine how much fluid is supplied to the tank when replenishing the same, thereby providing a check against the practice of giving short measure when purchasing gasolene or other liquid fuel or fluid.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the invention as claimed.

Having thus described the invention what is claimed as new, is:—

In means of the character specified the combination of a tank, a tube arranged vertically in the tank and secured at its lower end to the bottom thereof, a rod extending through the tube and bottom of the tank, a second tube slipped over the first mentioned tube, a cap closing the upper ends of both tubes and secured to the said second tube and having a boss which is secured to the upper end of the rod and constitutes one member of a ball bearing, a ring supported upon the upper end of the first mentioned tube and grooved in its upper side, balls arranged between such ring and the said boss, a float arranged within the tank and having spiral connection with the second tube, and guide rods connected with the tank and directing the float in its vertical movements and serving to prevent turning thereof.

In testimony whereof I affix my signature in presence of two witnesses.

LELAND A. FRAME.

Witnesses:
E. CARLSON,
H. R. CROZIER.